Figure 1:
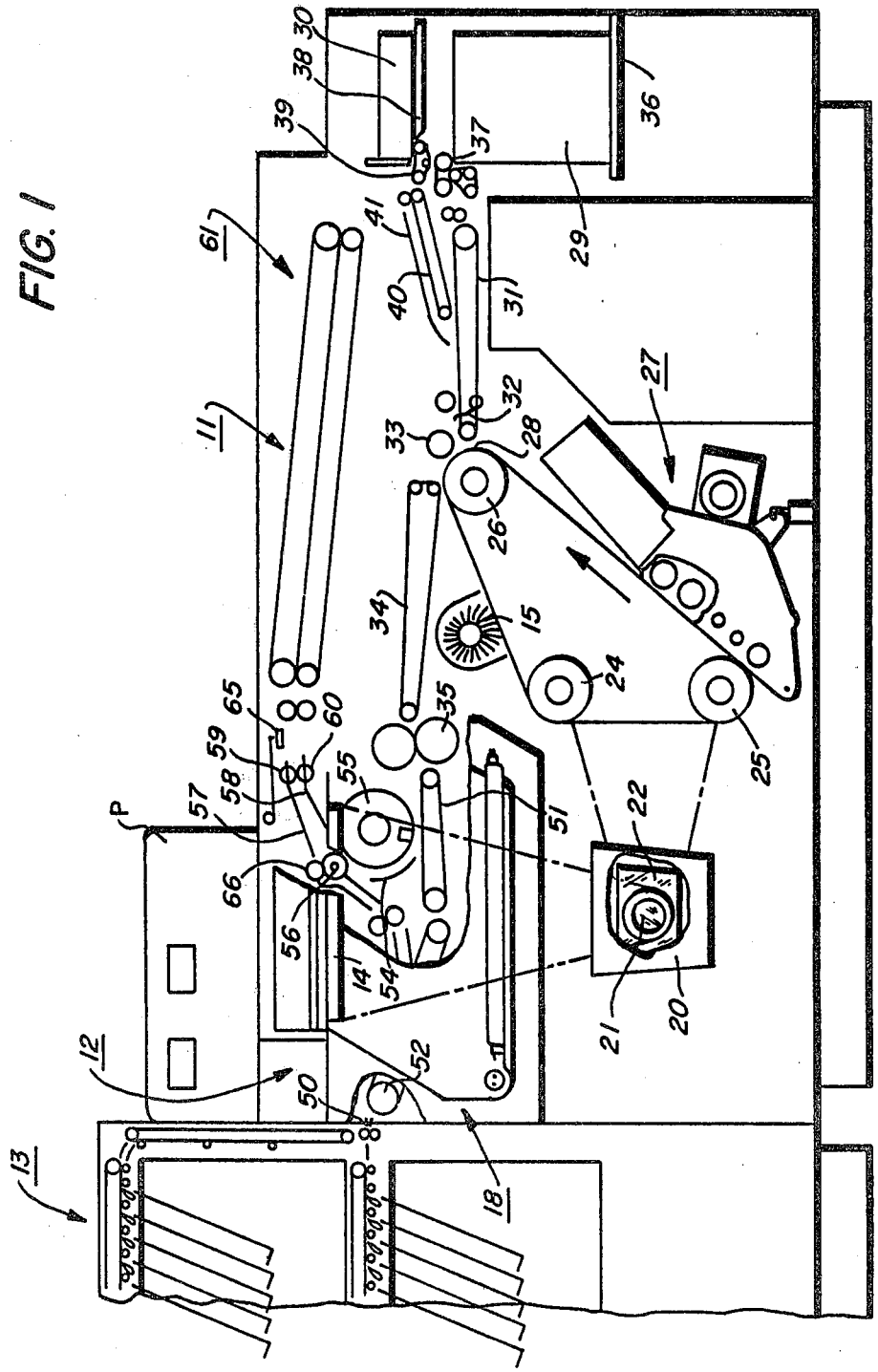

United States Patent [19]

Buddendeck et al.

[11] 4,412,740
[45] Nov. 1, 1983

[54] VERY HIGH SPEED DUPLICATOR WITH DOCUMENT HANDLING

[75] Inventors: Gerald A. Buddendeck, Penfield; Karl M. Kau, Rochester, both of N.Y.

[73] Assignee: Xerox Corporation, Stamford, Conn.

[21] Appl. No.: 314,633

[22] Filed: Oct. 26, 1981

[51] Int. Cl.³ .............................................. G03G 15/00
[52] U.S. Cl. .......................... 355/14 SH; 355/3 SH; 271/225; 271/226; 271/DIG. 9; 271/3.1
[58] Field of Search .................. 271/225, 3.1, DIG. 9, 271/4.3, 65, 276, 195; 355/14 SH, 14 R, 3 SH

[56] References Cited

U.S. PATENT DOCUMENTS

| | | | |
|---|---|---|---|
| 4,080,060 | 3/1978 | Nothmann | 355/23 |
| 4,140,387 | 2/1979 | Gustafson | 355/14 |
| 4,158,500 | 6/1979 | DiFrancesco et al. | 355/14 |
| 4,176,945 | 12/1979 | Holzhauser et al. | 355/23 |
| 4,206,995 | 6/1980 | Legg | 355/14 C |
| 4,234,180 | 11/1980 | Looney | 271/3.1 |
| 4,238,126 | 12/1980 | Langdon | 271/3.1 |
| 4,264,187 | 4/1981 | Rhodes, Jr. | 355/14 SH |
| 4,269,406 | 5/1981 | Hamlin | 271/108 |
| 4,272,181 | 6/1981 | Treseder | 355/14 SH |
| 4,278,344 | 7/1981 | Sahay | 355/14 SH |
| 4,330,197 | 5/1982 | Smith et al. | 355/14 SH |
| 4,335,954 | 6/1982 | Phelps | 355/14 SH |
| 4,365,889 | 12/1982 | Silverberg | 355/14 SH |

*Primary Examiner*—A. C. Prescott
*Attorney, Agent, or Firm*—Bernard A. Chiama

[57] ABSTRACT

A document handling apparatus for a duplicating machine or copier is disclosed and includes a document supply tray, a turnaround roller and the exposure platen arranged in a general horizontal configuration wherein all operating areas and separate transports are available for operator observation and jam clearances. The turnaround roller permits return of document sheets to the platen in an inverted orientation to permit copying of duplex document sheets. The rotational speed for this operation may be significantly increased relative to the processing speed of the copier and the normal feeding speeds of the document sheets from the supply tray to the platen in order to maximize throughput of the copier. For normal return of the document sheets for the platen area, the rotational speed of the roller may be relatively high compared to the document feeding speed, thereby minimizing time losses due to machine pitch spacings between document sheet changes.

8 Claims, 2 Drawing Figures

VERY HIGH SPEED DUPLICATOR WITH DOCUMENT HANDLING

This invention relates to an improved reproduction system having an improved document handling apparatus for use in such system.

With the advent of higher speed and more sophisticated copying machines, considerations as to how the mass of copy sheets generated can best and most effectively be handled has assumed increasing importance. One way has been to provide a reproduction system with an input device in the form of a recirculating document handling apparatus. In this system, a document sheet is removed from a collated set of document sheets, placed on an exposure platen for exposure at the rate of one exposure for each document sheet, and returned to the top of the set in the document handling apparatus until the set of documents sheets has been completely circulated through the apparatus, and a copy set has been produced. The set of document sheets is then recycled for the reproduction of a second copy set, and so on.

After each copy set is produced and collected at a collection station, a finishing device such as a stitcher or stapler is activated to bind the set. These systems are of the pre-collation type wherein the document sheets are pre-collated in the document handling apparatus prior to commencement of a reproduction run. The output for the reproduction machine will likewise be pre-collated in sets corresponding to the sequenced numbered document set in the document handling apparatus. The copy sheets are collected in collated sets as they are sequentially produced so that binding may be effected without the interaction of additional devices. Such systems are described in U.S. Pat. No. 4,134,672.

The disadvantage in these systems having continuous document recirculation to produce each bound copy set is that the speed of production is limited to the mechanical limitations in the speed of handling document sheets in the document handling device. It necessitates that the input device, the document handler, be of extreme high reliability as it places the original document sheets under the severe stress of being constantly recirculated. In practice, for these systems, there appears to be a threshold in the production rate of finished copy sets. The failure rate in the document handling apparatus increases beyond acceptable limits when too high a speed of sheet movement in the apparatus is attempted.

In order to achieve still higher rates of production of finished copy sets, various arrangements have been devised, some of which are in the marketplace, which utilize the concept of post-collation rather than precollation. Post-collation systems utilize document handling wherein a predetermined number of light images are produced for each document sheet, say for example, of page one of a multi-page document, before a successive document sheet, perhaps page two of the document, is likewise imaged. This sequencing in turn may be repeated many more times if a very large number of copy sets are to be reproduced. In this manner, the mechanical movements involved in document handling are held to a minimum, the parts of the document handler are not subjected to undue wear and the document sheets are handled less frequently. In these systems copy sheets are collated in one or more sorter bins for final use. In U.S. patent application Ser. No. 180,184 filed Aug. 21, 1980 in the name of the same assignee of the present application, a single sorter array is disclosed for collecting copy sets, and a stapling apparatus cooperates with the array to produce fixed copy sets. The bin array or sorter thereby serves as a buffer in the production of stapled copy sets.

In the post-collation/finishing system however, wherein the document handling apparatus is programmed to effect multiple exposures of each document sheet before successive document sheets are exposed, there are situations during normal use which result in losses of a variable number of pitches or machine cycles while certain functions must be performed to condition the system for continued operation. For example, at times a numerical sequencing of document sheets must be restored in the document handler after a complete cycling of the sheets has left them out of sequence. This may occur when one is making a copy on paper which requires the first image to appear always on the same side of copy sheet, such as for punched-hole paper or paper with letterheads, and when the reproduction run is running duplex to simplex jobs. Other times, when in the duplex mode of operation, while copying duplex to duplex, if there are an odd number of times the documents are circulated to complete a job. The set of document sheets must be cycled by the document handling apparatus, without copying in order to restore the set back into initial sequence preparatory to once again reproducing copies.

Therefore, it is the principal object of the present invention to minimize the losses in machine pitch time in handling document sheets from a stack of sheets, to an exposure platen for a reproduction machine and then to return the sheet to the stack.

Another object of the present invention is to handle documents in all the four modes of duplication, that is, simplex to simplex, simplex to duplex, duplex to simplex, and duplex to duplex for a duplication processor having super high speed throughput.

Still another object of the invention is to minimize operator involvement in jam clearances and restoring a document handling apparatus to operating condition after jam situations in the apparatus.

These and other objects of the invention are accomplished by arranging a document supply tray, a turnaround roller and the exposure platen of a duplicating machine or copier in a general horizontal configuration wherein all operating areas and separate transports are available for operator observation and jam clearances. The turnaround roller permits return of document sheets to the platen in an inverted orientation to permit copying of duplex document sheets. The rotational speed for this operation may be significantly increased relative to the processing speed of the copier and the normal feeding speeds of the document sheets from the supply tray to the platen in order to maximize throughput of the copier. For normal return of the document sheets for the platen area, the rotational speed of the roller may be relatively high compared to the document feeding speed, thereby minimizing time losses due to machine pitch spacings between document sheet changes.

A companion application, filed on Oct. 23, 1981 Ser. No. 314,801 and assigned to the same assignee, discloses and claims the improvement to the present invention with regard to an arrangement wherein the turnaround roller is utilized to direct document sheets fed from the tray back into the tray directly so as to invert the sheets, rather than permitting the sheets to be placed upon the platen, without copying, for the inverting procedure. A control is also described for implementing the operation in conformance with operator selection, for the occasion when this operation is appropriate.

Figure 2:
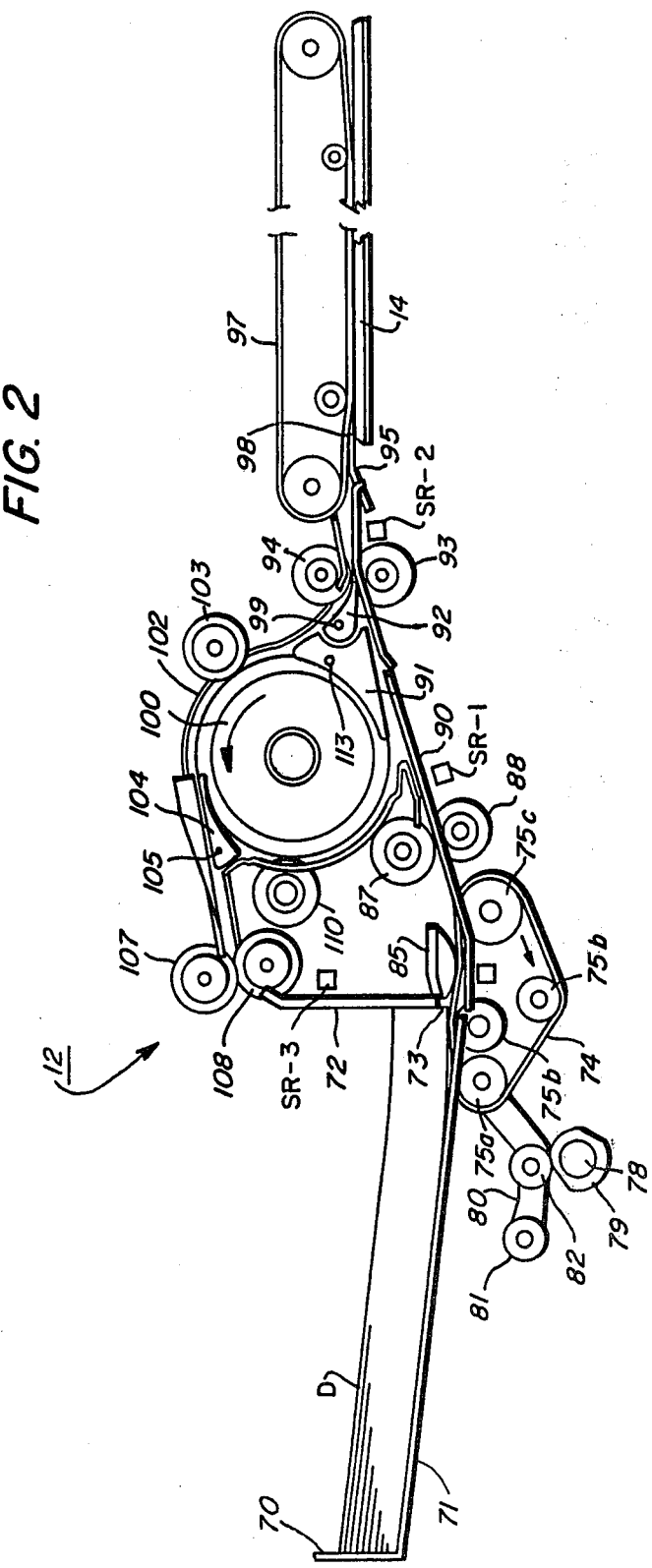

Other objects and advantages will become apparent from the following description taken in conjunction with the accompanying drawings, wherein:

FIG. 1 is a schematic representation of an exemplary reproduction system incorporating the document handling apparatus of the present invention; and FIG. 2 is a schematic view showing details of the document handling apparatus for the system of FIG. 1.

For a general understanding of a reproduction machine with which the present invention may be incorporated, reference is made to FIG. 1 wherein components of a typical electrostatic printing system are illustrated. The printing system is preferably of the xerographic type as one including a xerographic processor 11, and a document handling apparatus 12. Preferably the processor 11 is the same as the processor in the commercial embodiment of the Xerox duplicators, models 9200 and 9400, which utilizes flash, full frame exposure, for very high speed production. A document handling apparatus 12 in accordance with the present machine is shown in conjunction with the processor 11. Operating in conjunction with the processor 11 and apparatus 12 is sorting apparatus 13 and thereby forms the reproduction system shown in FIG. 1.

The xerographic processor 11 is arranged as a self-contained unit having all of its processing stations located in a unitary enclosure or cabinet. The processor includes an exposure station at which an original to be reproduced is positioned on a glass exposure platen 14 for projection onto a photosensitive surface in the form of a xerographic belt 15.t The original or set of individual document sheets are selectively transported by the document feed apparatus 12 one document sheet at a time to the platen 14 for exposure. After a predetermined number of exposures of each document sheet is made, the same is returned to the top of the set until the entire set has been copied.

Imaging light rays from each of the document sheets, which is flash illuminated by an illumination system 18 having suitable lamps 19 are connected to a suitable flashing circuit (not shown) which is controlled by the programmer for the processor in timed sequence, and in accordance with the program the operator has preset in the machine. Further details in this regard are not necessary since the Xerox 9400 reproduction machine operates in this manner and is well known. The xerographic belt 15 is mounted for movement around three parallel arranged rollers 24, 25, 26 suitably mounted in the processor 11. The belt is continuously driven by a suitable motor (not shown) and at an appropriate speed. The exposure of the belt to the imaging light rays from a document discharges the photoconductive layer in the area struck by light whereby there remains on the belt an electrostatic latent image corresponding to the light image projected from the document. As the belt continues its movement, the electrostatic latent image passes a developing station at which there is positioned a developer apparatus 27 for developing the electrostatic latent image.

After development, the powdered image is moved to an image transfer station 28 where the developed image is transferred to a support surface, normally a sheet of copy paper, brought from a main or auxiliary paper tray 29, 30, respectively, as will appear.

Each sheet is conveyed to the transfer station by a conveyor 31 which cooperates with sheet registration fingers 32 (only one shown). These fingers rotate in a counterclockwise direction, as shown in FIG. 1, and engage the leading edge of a sheet, being adapted to effect the accurate timing and positioning of a sheet relative to the movement of a developed image on the belt 15 and the other timed events in reproduction processing. Further details of the timing relationships and related structure and events are described in U.S. Pat. Nos. 3,790,270; 3,796,486; and 3,917,396, commonly assigned.

The sheet is moved in synchronism with the movement of the belt 15, and passes between a transfer roller 33 and the belt 15 at the transfer station. After transfer, the sheet of paper is stripped off the belt 15 and transported by a vacuum conveyor 34 in an inverted condition to a fusing station where a fuser device 35 is positioned to receive the sheet of paper for fusing the powder thereon. After fusing, the sheet is transported directly to the sorter apparatus 13 for collation if the simplex mode of reproduction has been selected or to the auxiliary tray 30 if the duplex mode has been chosen.

The system comprising the processor 11 and the document handling apparatus 12 is under control of a programmer P having an operator control panel which permits an operator various options: to turn the entire system ON or OFF; to program the reproduction system for a desired number of reproductions to be made of each original document sheet or set; to select whether simplex or duplex copies are to be made from simplex or duplex originals to select a desired output arrangement, that is, sets mode or stacks mode, stapled or unstapled; to select one of a plurality of paper trays; to condition the machine for the type of document, that is, whether one sided or two sided, to select a copy size reduction mode, and other desirable functions. The programmer P also includes a controller which provides all operational timing and synchronization between the processor 11 and all of its xerographic processing functions, and system control functions, th automatic events to be described hereinafter. The controller may include any suitable microprocessor having a CPU and the appropriate machine clock, but preferably the processor is one similar to the Intel 8080 microprocessor manufactured by the Intel Corporation, Santa Clara, Calif., and having sufficient ROM's and RAM's for all of the necessary functions in the reproduction system.

As previously stated, copy sheets are supplied from either the main paper tray 29 or the auxiliary paper tray 30. Main paper tray 29 includes a suitable elevator type base 36 on which a supply of sheets rest, base 36 being supported for automatic up and down movement by suitable means (not shown). Such movement being arranged to maintain a top-feeding sheet feed mechanism 37 in operative contact with the topmost one of the sheets on the elevator 36. The sheet feed 37 is operated intermittently in timed relationship to spacing of images on the photoreceptor belt 15 under control of the programmer P, and serves to advance the topmost sheet from the supply stack 29 to the main paper supply transport 31.

The auxiliary tray 30, in the exemplary arrangement shown, is arranged above main tray 29 and includes an air floatation baseplate 38 upon which a supply of sheets may be placed. A bottom-feeding sheet feed mechanism 39 is positioned below the baseplate 38 for feeding sheets from the bottom of the stack of sheets thereon. Assisting in this feeding operation is an air floatation system, not shown, which substantially reduces the weight of the stack to permit easy withdrawal of sheets from the bottom. The sheet feed mechanism 39 which is intermittently driven in the same manner as the main tray feed mechanism 37, advances one sheet at a time to an auxiliary paper supply transport 40. The transport 40 is suitably driven by a drive system (not shown) and is disposed to discharge sheets drawn from auxiliary tray 30 onto the operating run of main supply transport 31. The sheets from auxiliary tray 30 are thereafter fed to the transfer station. Guides 41 serve to maintain the sheets in driving contact with the auxiliary paper supply transport 40 during movement therealong.

The auxiliary tray 30 is of dual purpose. In one, the tray contains a supply of copy sheets to be used while the operator is loading the main tray 29 so as to maintain productivity when the main tray has depleted its supply. In the other purpose, the auxiliary tray 30 is utilized in the production of duplex copies. In this mode, simplex copies are transported from the fuser apparatus 35 to the tray 30 for each series of exposures for a document sheet, and are transported back again to the transfer station to receive a toner image on the back side of each of the copy sheets in the auxiliary tray. If copying is from simplex document sheets, then two document sheets will have been exposed to achieve duplex copy sheets. If a duplex document sheet is to be copied, then both sides of the document sheet would be exposed, either sequentially or by corresponding stack of the sheets.

During operation, copy sheets leaving the processor 11 after exiting the fuser apparatus 35 are conveyed to an exit slot 50 by way of transports 51, 52, if the reproduction system is set for the simplex copying. If the system has been programmed for duplex copying, copy sheets will be directed to the auxiliary tray 30 as previously stated. If the latter mode of operation is selected, copy sheets conveyed by the transport 51 are intercepted by a deflector 54 which is adapted for movement into the sheet path. When the deflector 54 is in the interrupt function, the copy sheets are carried around a roller 55 and through the nip formed by this roller and a cooperating roller 56. The sheet is advanced by rollers 55, 56 between an upper sheet guide baffle 57 and a lower sheet guide baffle 58 to a second roller pair 59, 60 which further advances the sheet to a transport mechanism 61 which carries the sheet to the auxiliary paper tray 30.

When the desired number of one sided copies have been produced and delivered to the tray 30, the paper handling mechanism for the main tray 29 may be inactivated and the paper handling mechanism for the auxiliary tray 30 activated. It should be understood that in following the paper path around roller 55 and between roller 59, 60 the copy sheets are turned over, i.e. the printed material on the sheets is face up in the tray 30.

Upon re-energization of the system, the sheets from the tray 30 are fed through the reproduction machine by means of the feed belt 39 and the transport 40 for copying on the blank side of the sheet in the same manner as described heretofore. With the reproduction system being programmed for the duplex mode, and after completion of the correspondingly programmed number of one sided sheets, re-energization of the system also produces the raising of a sheet stop 65 into the paper path between the upper guide baffle 57 and the lower guide baffle 58. The feed roller 59 is mounted with the stop 65 to be raised therewith during the phase of duplex copying. In this manner, the feed roller 59 will be displaced away from lower feed roller 60 so that papers fed therebetween are not forwarded thereby.

The sheet stop 65 may be formed of a ring-shaped resilient material being compliant enough to resume its circular shape and thereby effecting the insertion of a sheet into the nip formed between roll 56 and a cooperating roll 66, the trailing edge of the sheet being carried by roll 56 into the nip. The rolls 56 and 66 are formed of a high friction material to assure positive feeding of a sheet travelling toward stop 65 and positive feeding of the sheet travelling away from stop against the drag force generated between two sheets which may be in the inverter area at the same time travelling in opposite directions. The purpose of the stop 65 and the cooperating action of the rollers 56, 66 is to invert each copy sheet, while production is in the duplex mode, so that the odd numbered page on a copy sheet reaching the exit slot 50 is face down on the sheet. As will be discussed hereinafter, the inverter 54 and the stop 65 cooperates in various modes of operation.

As shown in FIG. 2, the document handling apparatus 12 serves to feed one document sheet at a time from a supply of document sheets D into copying position on the platen 14 where a single exposure if only one copy set is programmed, or a plurality of exposures may be made. Following exposure one or more times, each document sheet is automatically returned to the document supply and the next document sheet, if any, is brought into the exposure position on plate 14. As will appear, document sheets returned to the supply stack may be recycled by the apparatus 12 or simply removed by the user when the copying program is completed.

The document handling apparatus 12 includes a sheet support means or tray 70 for supporting document sheets and having a bottom plate 71 tilted at an angle with the leading edge of the sheets slightly below the main body of the stack of document sheets. The leading edges of the stack D rests against a vertical wall 72 of the tray 70 which is open at its lower end to form an opening 73 through which document sheets may project during feeding operations.

A document separator feed belt 74 is rotatably supported and driven around four rollers 75a, 75b, 75c, 75d positioned below the leading edge of the stack D so that a portion of the belt 74 is free to extend into the opening 73 below the bottom document sheets to lift the leading edge of the stack D. Such lifting action is accomplished by the timing action of the programmer P which controls rotation of a shaft 78 having a cam 79 secured at one end thereof and which serves to periodically rock a lever 80. The lever is pivoted at one end at 81 and includes a cam follower 82 cooperable with the cam 79 and the roller 75a at the other end. The portion of the belt 74 between the rollers 75a, 75b, normally lightly engages the bottom document sheet in the tray 70 so that the belt slips past the sheet during driving motion thereof in the direction of the arrow.

When the cam 79 rotates its high lobe side against the follower 82, the lever 80 rocks counterclockwise the roller 75a to force the belt 74 in friction engagement with the bottom document sheet to feed the same forward through the opening 73. This document feed operation drives the document sheet along with the belt and between the same and a retard pad 85 which is normally in contact with the belt. The pad 85 insures that only one document sheet at a time is fed and serves to hold back any other sheet above the sheet being fed.

The sheet continues to be fed until the leading edge thereof is driven into the nip of feed roller pair 87, 88 which defines a wait station whereat the sheet is held as at this time the roller pair 87, 88 is not in rotation and the cam 79 has moved away from the level 80 to terminate forward feeding of the sheet. A wait station sensor SR-1 senses the presence of a document sheet and conveys this data to the programmer P in order to initiate rotation of the roller pair 87, 88 by a suitable drive thereby.

The resultant drive of the document sheet moves the same across an extended guide plate 90 and below two gates 91, 92 and into the nip of an on/off drive roll pair 93, 94. The latter roll pair continues moving the document sheet over the registration member or gate 95 and onto the exposure platen 14 where further movement thereon is pushed up by a document belt 97. This belt transports the document sheet fully upon the platen and slightly beyond the edge 98 of the registration gate 97, the edge being slightly above the plate of the platen.

By a suitable program in the logic of the programmer P, the transport belt 97 is then reversed to produce reverse movement of the document sheet until the trailing edge thereof abuts the edge 98 thereby effecting registration of the document sheet. The system logic then produces one or more exposures of the sheet until the programmed number of exposures have been made for that sheet at that time. Upon this occurrence, the transport belt 97 commences its reverse drive movement at the same time the registration member 95 has been retracted below the plane of the platen. This activity lowers the gate 98 permitting the document sheet to be transported off the platen 14. The registration gate 95 is movable into and out of registration portion by any suitable mechanism, not shown, which actuation is controlled by the programmer P. In the alternative, the document sheet may be driven off the platen 14 by the continuously driven belt 97 working in conjunction with a roller (not shown) positioned between the runs of the belt 97, above the edge 98. This roller could be logically controlled to force the lower run of the belt upon the document sheet to force the same over the member 95 and off of the platen.

As the document sheet leaves the platen area, its movement is picked up by the roller pair 93, 94 now rotating in the reverse direction from that which delivered the sheet to the platen area. In leaving the platen area, the sheet is directed upwardly by the gate 92 which now has been deflected or turned clockwise about its pivot 99. The sheet is conveyed by the roller pair 93, 94 upon the gate 92 and into the arcuate space between a rotating turnaround drum 100 and a peripheral conforming guide plate 102. A series of rollers 103 extend into this arcuate space to be in contact with the drum surface for transporting the sheet further along the drum. In leaving the platen area, the exiting of the document sheet is sensed by an exit sensor SR-2 to provide the Programmer with this data.

As the document sheet is carried around the turnaround drum 100, it reaches a duplex gate 104, pivoted at 105 to be directed thereby either back into the tray 70, if simplex documents are being copied, or completely around the drum and back onto the platen 14 if duplex document sheets are being copied. If the simplex mode has been selected, the gate 104 is rocked in a clockwise rotation to permit a document sheet to move thereover and into the nip of roller pairs 107, 108 to be driven thereby into the document tray 70 with the same page orientation as it had before being fed from the tray. This document sheet is so placed upon the stack of other document sheets to await its turn again to be fed to the platen to be copied as before. A return sensor SR-3 senses the return of the sheet as data for the programmer P as part of the copy count program.

In any event, if the duplex mode of operation has been selected, the duplex gate 104 is rocked in a counterclockwise rotation to permit the sheet to be driven thereunder and into continued driving movement by a series of rollers 110. The document sheet once again is driven between the guide plate 90 and below the gates 91 and 92, which have previously been rotated by the machine logic to permit this movement of the document sheet. Once again, the sheet is positioned upon the platen 14 by the combined action of the on/off drive roller pair 93, 94 and the transport belt 97. In this sequence however, the document sheet had been inverted to bring the other side thereof (side two, or even side) upon the platen for copying.

Assuming that the odd side of the sheet, say page 1, was the first side copied in the previous copying exposures, now page two is upon the platen for copying exposures. After the programmed number of exposures have been completed, the document sheet is returned to the tray 70 as was the case for a simplex document sheet as described above. In this case however, the even side of the sheet, or page two, becomes oriented in the tray face down. It will be seen then that for a set of duplex document sheets being copied in this manner, the even sides of the sheets would all be oriented in the face down position, so that the tray will not present the proper sequence of papers in a document set.

As will be seen later in the description of the duplex-to-duplex mode of operation, another pass of the set of document sheets, the second pass, will restore the numerical sequence of the document sheets and all other even-numbered passes will do likewise. In order to reorient the numerical sequence of document sheets immediately without another copying pass, the set of sheets must be circulated individually around the turnaround drum 100 in order to place the odd numbered document pages in the face down position. In these positions, the document sheets in a set are disposed for recirculation into copying position. The re-orientation is under control of the programmer P after the return sensor SR-3 has indicated that a document sheet has been returned to the tray 70, presumably the last sheet, and this data is compared to the number of document sheets in the set. With this arrangement, maximum throughput is achieved and only one machine pitch or copy cycle is lost during a change in document sheets. This is accomplished by timing events so that a document sheet is travelling over the drum 100 on its return to the tray 70 while another document sheet is being placed on the platen 14 from below the drum.

Circulation of the document sheets around the turnaround drum 100 for re-orienting the same, as described in the preceding paragraph is effected by programmed rotation of the gate 91 about its pivot axis 113. When this circulation procedure has been activated, document sheets are bottom fed from the tray 70, as was the case during the ordinary copying mode of operation, by the now actuated feed belt 74 working in conjunction with the retard pad 85. The sheets are transported by the roll pair 87, 88 to across the arcuate top surface of the gate 91, previously pivoted in a counterclockwise direction to permit this deflection. During this operation, the function of the wait station sensor SR-1 and the on/off operation of the roll pair 87, 88 is inhibited in order to permit very rapid circulation of the document sheets from the tray 70, around the turnaround drum 100 and back into the tray in the shortest time possible in order to minimize loss of productivity. At the termination of this circulation of document sheets, as determined by the sensing of the last sheet by the return sensor Sr-3 when compared to the document sheet count, the document handling apparatus 12 is again ready for another cycle of copying. This occurrence may be determined in the machine logic so as to commence cycling automatically in the event the operator has preset the programmer P to produce copy sets greater than the number produced during the first cycling of document sheets. In any event, after the document sheets have been re-oriented, the gate 91 is rocked to its normal position as shown in FIG. 2 preparatory to another copying cycle.

For each complete cycling of the apparatus 12, and corresponding production of copy sheets, the bins 120 of the sorter 13 will receive the copy sheets as collated sets. As shown, the sorter comprises two sorter modules 121, 122, each having twelve bins. With the document apparatus 12 being programmed to effect the production of twelve exposures for each document page placed on the platen 14, the first series of copying exposure will produce corresponding twelve copy sheets. If the simplex mode of operation has been selected, the twelve copy sheets will be transported one sheet each to the bins of the upper sorter module 121. If the duplex mode has been selected, the twelve copy sheets are conveyed to the auxiliary tray 30 to await the inverting of the document sheet by the turnaround drum 100 and associated structure so as to produce copies indicative of the other side of the document sheet. Upon completion of the duplex copy sheets, these are transported to the upper sorter module, one to each bin. This process repeats until the document set has been cycled and corresponding copy sets have been collated. If more than twelve copy sets have been programmed for production, the lower sorter module 122 will be utilized to collate the remaining copy sets up to twelve sets if twenty-four or less copy sets have been programmed.

While the number twelve has been described for the number of sorter bins per module and the number of exposures per document page, it will be understood that any other matching number may be utilized. It will also be understood that another form of output for the process 11 and apparatus 12 may be utilized instead of the sorter 13. For example, a stapling or stitching apparatus may be coupled to processor, such as the arrangement disclosed in the above-referred to U.S. patent application Ser. No. 180,184.

It will be appreciated that the foregoing described reproduction system comprising the processor 11, the document handling apparatus 12 and the output section 13 in the form of sorter modules, is arranged for producing copies of documents in all of the four modes of input/output modes of operation, that is (1) from simplex documents to simplex copies, (2) from simplex documents to duplex copies, (3) from duplex documents to simplex copies, and (4) from duplex documents to duplex copies.

In the first mode of operation, simplex to simplex the document sheets are individually applied to the platen 14 and exposed a predetermined number of times, in multiples of twelve exposures. As each document sheet is exposed on the side carrying information being copied, it is returned directly to the tray 70 by way of the gate 92, the space between the drum 100 and guide 102, over the gate 104 and into the tray 70. Copy sheets are fed from the main tray 29, are processed, and transported directly out of the exit slot 50 to the sorter modules. The auxiliary tray 30 is not utilized and the inverter gate 54 is positioned out of the path of movement of the copy sheets to the exit slot.

In the second mode of operation, simplex to duplex, the document sheets are handled as in the simplex to simplex mode. In this mode, however, the inverter gate 54 is deflected downwardly to intercept copy sheets bearing page one, or the odd numbered pages to direct the same into the auxiliary tray 30. Since copy sheets bear images face down through the processor 11, the blank sides of copy sheets will be face down in the tray 30. As will be understood, pairs of successive document sheets being presented to the platen 14 for exposure will provide the corresponding two side copies on the copy sheets.

After the predetermined number of exposures have been made for the odd numbered side of a document sheet, the copy sheets bearing the odd numbered pages face up in the tray 30 are fed from the tray to be processed again on the face down blank side to receive the even numbered page. Since the copy sheets bear face down even pages, they must be inverted before being inserted into the sorter bins in order to maintain numerical sequence. To accomplish this inversion, the stop member 65 is raised into the path of sheet movement to the tray 30 and the inverter gate 54 is lowered to intercept copy sheets leaving the fuser 35. The duplex copy sheets, with even numbered pages face down, are thereby inverted so that they leave the exit slot 50 with odd pages face down. In this manner, as the copy sheets are being collated in the sorter modules, they will appear in proper numerical sequence.

In the third mode of operation, duplex originals to simplex copies, the document sheets are handled as previously described with the alternate turnaround function of the drum 100 and with the proper sequencing of the gates 91, 92 and 104. As in the previous modes of operation, the document sheets are face down in the tray 70 at the start of a reproduction run, that is, odd page numbers face down and even numbered pages are face up. In this mode of operation, the turnaround drum 100 path is utilized twice during each pass, that is, to place side two on the platen after imaging side one and then to restore the initial order of the originals before returning the document to the tray 70.

In starting a run, the first document sheet is brought to the platen with its odd page face down and exposed the predetermined number of times, which our example is twelve exposures. The resultant copy sheets are transported to the sorter 13 for sorting by way of transports 51, 52. After the twelfth exposure, the document sheet is removed from the platen, diverted around the turnaround drum 100 and sent back to the platen with the even numbered page face down. After twelve exposures of this page, the resultant copy sheets are transported to the sorter for sorting. After the predetermined number of exposures have been made, the document sheet is again diverted around the drum and sent back to the platen. However, it is immediately removed therefrom and carried around over the drum and back to the tray 70. In this manner, the original order of the document sheets is restored. This procedure results in the skipping of three machine pitches between document sheet changes however, in this sequence of operation, twenty-four copies have been produced, twelve copies of each side of the document sheet. Since this procedure is a simplex copy mode, neither the inverter gate 54 nor the stop 65 are inserted into the processor paper path for any portion of the copying operation.

In the fourth mode of operation, duplex originals to duplex copies, if the number of passes of the complete set of document sheets is odd, one additional pass is required, without imaging, at the end of the reproduction run to restore the initial sequence of the document sheets.

In starting a run, the first document sheet is transported to the platen odd face down and exposed the predetermined number of times. The resultant copies are transported to the auxiliary tray 30 for further processing. After the last exposure for each document sheet, the sheet is removed from the platen, diverted to the turnaround drum 100 by the gate 92 and, with the gate 104 pivoted upwardly and the gate 91 in its clockwise position, the sheet will be returned to the platen with the other side of the sheet (even number) down. After twelve exposures of the even-numbered side the document sheet is again removed from the platen, but now the gate 104 is rotated to permit the return of the sheet to the tray 70. With this return, the even side is face down in the tray as well as all other document sheets in the set being copied, that is, the sheets will be sequenced with all even numbered pages face down. Although the order of the sheets remains unchanged during handling and copying, the sequence of the document sheets is altered by an inversion of each document sheet during each pass of the set through the document handling apparatus. The initial sequence of the document sheets is restored at the completion of each of the even numbered passes, i.e. Pass 2, 4, 6, 8, etc.

For production runs which require an odd number of passes, the initial sequence is restored at the end of the run by cycling the sheets through the document handling apparatus as before but without exposing the sheets. During an even pass through the document apparatus, to compensate for the inversion created by the previous pass, copies of the even document sheets are made during side one copy processing in the processor 11, and copies of the odd document sheets are produced during side two copy processing. Since the sequence of document sheets and the copy destination of a document sheet is dependent upon the document apparatus pass number, it is necessary that the inverter gate 54 and stop 65 respond to select the appropriate paper path.

As previously stated, the turnaround drum 100 may be utilized to restore the numeral sequence of page numbers of the document sheets of a set after each pass of the set upon the platen for copying depending upon the desires of the operator. A suitable control switch (not shown) may be utilized to instruct the machine logic for this selectable feature. Otherwise, the sequence will be restored automatically during a reproduction run of many passes for even numbered passes or recirculation of a document set.

The drum 100 may be selectively utilized for other purposes wherein document sheets are not transported to the platen in order to maintain numerical sequence of the document sheets. One such purpose would involve copy sheets having pre-printed letterheads or are pre-punched. In the duplex to duplex copy mode, copy images are inconsistent with sheet orientation for copies produced during the even passes. To maximize throughput during this copy mode, the foregoing description of method of operation has been to copy side 2 of each duplex document sheet first on the even numbered passes. This method of operation is satisfactory for plain copy sheets, but is inconsistent for pre-oriented copy paper. For example, the pre-punched holes end up on the wrong edge for copies made during the even numbered passes and letterheads end up on side 2 of the copy sheets. The only solution to this problem, of course, at the sacrifice of throughput is to re-invert document sheets as previously described after each pass when making copies.

Two other situations may arise wherein document sheets must be re-inverted without making copy. As described above, re-inversion without copying may be achieved either by bringing each document sheet to the platen and to return the same over the drum 100, or by the more preferred and faster method of utilizing the gate 91 to direct document sheets around the drum 100 and back to the tray. In one of the situations, re-inversion occurs after each pass when making simplex copies of duplex document sheets, and in the other situation, re-inversion occurs after the last pass in the normal duplex to duplex mode making copy on plain paper (non-oriented), when the last preselected pass is an odd-numbered pass.

For example, while the foregoing description of operation is specifically directed to the handling of document sheets face down, that is, with page one of the first sheet of the document set at the bottom of a stack, and the last page of the set on the top, it will be understood that the reverse of this sequence may be handled by the boregoing-described apparatus. With the sequence of document sheets arranged with page one at the bottom of the stack, as in the foregoing description, the sorter bins in the sorter 13 must be arranged so that the copy sheets come to rest with page one the bottom of each bin and all subsequent sheets become collated with their odd numbered pages facing downwardly. In the reverse sequence of the document set, that is, with page one of the first sheet on top of the stack, and the last page at the bottom, the sorter bins must be rotated so that the copy sheets come to rest with the page indicative of the last document sheet first entering a bin, and all subsequent copy sheets become collated with their even numbered pages facing downwardly. In either arrangement of document sheets, they are nevertheless arranged in sequential order.

Therefore, while the invention has been described in connection with particular arrangements and operations thereof, no limitation is intended thereby except as defined in the following claims.

We claim:
1. In a reproduction machine having a document handling apparatus for feeding document sheets individually from a stack to an exposure platen for the machine and return to the stack for selective repeated copying of one side only or both sides of the document sheets, the improvement comprising:
   a document support member adjacent to one side of the platen for supporting the stack, said support member having means assogiated therewith for feeding each document sheet from the bottom of the stack, means defining a sheet path from the document sheet feed means to the platen without inverting the sheet, means defining a sheet path from the platen including a loop for inverting the sheet and to return the sheet to the platen in an inverted orientation, deflector means in said loop and being movable to an operative position for directing the document sheet back to the platen in the inverted orientation or movable to another operative position to return the sheet to the top of the stack in its original orientation, and control means for selectively actuating said deflector means to either of said operative positions.

2. The reproduction system of claim 1 wherein said loop is positioned on the same side of the platen as the document support member and therebetween.

3. In a reproduction machine having a document handling apparatus for feeding document sheets individually from a stack to an exposure platen for the machine and return to the stack for selective repeated copying of one side only or both sides of the document sheets, the improvement comprising:

a document support member adjacent one side of the platen for supporting the stack, means for separating a sheet from the bottom of the document sheet stack and feeding the same to the platen without inverting the sheet, means for removing the sheet from the platen and directing the same to return the sheet to the platen in an inverted orientation, and control means operatively associated with said last named means and being adapted to inhibit the return of the sheet to the platen but to return the same to the top of the stack thereby permitting the production of a simplex copy sheet.

4. A reproduction machine having a document handling apparatus for feeding document sheets from a stack onto a platen of the machine for exposure, the improvement comprising:

a tray for supporting the document being positioned on one side of the platen, means for feeding each document sheet seriatim from the bottom of the stack along a feed path and to transport the same onto the platen for exposure thereon, said means for feeding being adapted to transport each document sheet from the platen to the top of the stack in the tray along a return path, turnaround roller means arranged between the platen and said tray and with a portion of said feed path arranged along a section of the periphery thereof and with a portion of said return path along another section of the periphery, and deflector means arranged between the platen and said roller means for diverting sheets returning from the platen to said return path.

5. The reproduction machine of claim 4 wherein said portion of said feed path and said return path are diametrically opposed relative to said roller means.

6. The reproduction machine of claim 4 including a second deflector means arranged in said return path and being movable to direct sheets to said tray or to said feed path.

7. In the method of copying both sides of duplex document sheets arranged in a stack, with the sheets in the stack being arranged in sequential order, the improvement comprising:

supporting the stack of document sheets adjacent one side of the exposure platen of a copier, separating the bottom sheet from the stack and feeding the sheet to the platen without inverting the same, removing the sheet from the platen, along a path for inverting the same and return the sheet to the platen in an inverted orientation, and removing the sheet from the platen a second time and directing the sheet to the top of the stack in its original orientation.

8. In the method of copying both sides of duplex document sheets arranged in a stack, with the sheets in the stack being arranged in sequential order, the improvement comprising:

supporting the stack of document sheets adjacent the exposure platen of a copier, separating the bottom sheet from the stack and feeding the sheet to the platen in a first direction, removing the sheet from the platen along a path in a direction opposite said first direction and then returning the sheet to the platen in an inverted orientation, removing the sheet from the platen a second time in said opposite direction and directing the sheet to the top of the stack.

* * * * *